United States Patent
Hugick et al.

(10) Patent No.: US 6,817,273 B2
(45) Date of Patent: Nov. 16, 2004

(54) HIGH PRECISION SPINDLE ASSEMBLY, AND METHOD OF FORMING SAME

(75) Inventors: James Hugick, Rochester, NY (US); Patrick L. Muscarella, Penfield, NY (US)

(73) Assignee: Davenport Machine, Inc., Rochester, NY (US)

( * ) Notice: Subject to any disclaimer, the term of this patent is extended or adjusted under 35 U.S.C. 154(b) by 75 days.

(21) Appl. No.: 10/411,888

(22) Filed: Apr. 11, 2003

(65) Prior Publication Data

US 2004/0200328 A1 Oct. 14, 2004

(51) Int. Cl.[7] ................................................. B23B 1/00
(52) U.S. Cl. .......................................... 82/110; 82/147
(58) Field of Search ................... 82/110, 147; 409/231; 470/57, 81, 87, 107; 29/402.08

(56) References Cited

U.S. PATENT DOCUMENTS 4,752,158 A * 6/1988 Riley ........................ 408/14
4,867,619 A * 9/1989 Briggs ....................... 408/158
5,140,739 A * 8/1992 Yamaguchi et al. ......... 483/18

* cited by examiner

Primary Examiner—Willmon Fridie, Jr.
(74) Attorney, Agent, or Firm—Phillips Lytle LLP

(57) ABSTRACT

An improved spindle assembly (23) is adapted to be mounted in an opening (22) provided on a rotatable head (20) of a multi-spindle machine tool. The improved spindle assembly includes a tubular main spindle part (26) that is adapted to be inserted into the head opening and having a first abutment surface (42), a bearing retainer (27) adapted to be threaded into engagement with the head and having a second abutment surface (55) arranged to face toward the first abutment surface, at least one bearing (28) positioned radially between the head and spindle main part, and being arranged axially between the first and second abutment surfaces, and a retaining nut (29) adapted to be threaded into engagement with the spindle main part so as to form therewith an assembled spindle.

11 Claims, 3 Drawing Sheets

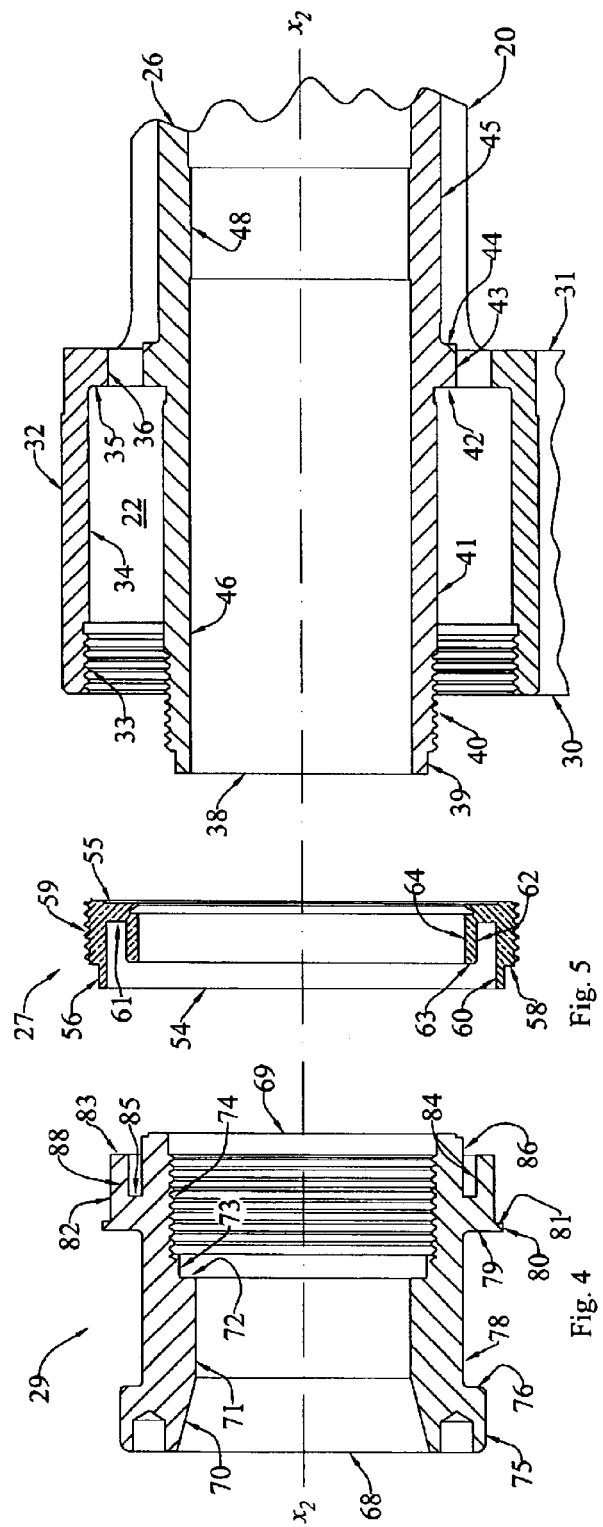
Fig. 4
Fig. 5
Fig. 6
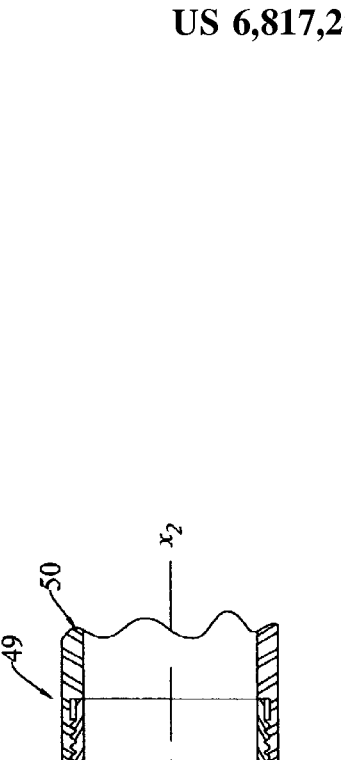
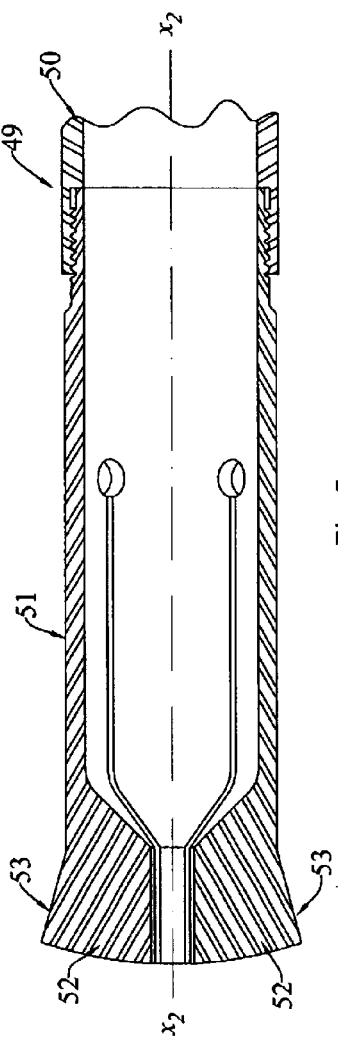
Fig. 7

HIGH PRECISION SPINDLE ASSEMBLY, AND METHOD OF FORMING SAME

TECHNICAL FIELD

The present invention relates generally to the field of machine tools, and, more particularly, to an improved high precision spindle assembly for use in a multi-spindle machine tool (e.g., a screw machine), and to an improved method of forming a precision spindle assembly for such use.

BACKGROUND ART

Machine tools exist in a myriad of different forms. Some machine tools, such as screw machines, have multiple spindles that are mounted in a head that is, in turn, rotatably mounted on a body or frame. In some cases, stock-feeding tubes communicate with the spindles, and are arranged to rotate with the head. The rotating head and feed tubes somewhat resembles a Gatling gun. Thus, while the head may be selectively rotated relative to the body or frame, the individual spindles are also arranged to rotate about their respect axes.

In some cases, a screw machine has an outer spindle that is adapted to be mounted on the rotatable head. An inner spindle is operatively arranged within the outer spindle, is keyed for rotational movement therewith, and is arranged to be selectively moved axially relative thereto. A collet is carried on the distal end of the inner spindle. The collet has fingers that are operatively arranged to interact with an inwardly-facing frusto-conical surface provided on the outer spindle. Thus, the inner spindle may be moved in one axial direction relative to the outer spindle to allow the spring-biased collet fingers to move radially away from the spindle axis, or may be moved in the opposite axial direction relative to the outer spindle to cause the collet fingers to move radially inwardly toward the spindle axis, as if to clamp down on a tool positioned in the collet.

It is highly desirable that the frusto-conical surface on the outer spindle assembly be ground so as to be concentric to the rotational axis of the outer spindle, as that outer spindle is actually mounted on the rotatable head. The more coincident the axis of the frusto-conical surface is to the axis of spindle, the more accurate the mounting.

One prior art arrangement of such a spindle is shown and described in U.S. Pat. No. 4,014,558. This patent broadly discloses a chuck-closing mechanism for an automatic screw machine. The patent discloses a single-piece outer spindle and an inner spindle carrying a collet. The fingers of the collet interact with a frusto-conical surface provided on the outer spindle. The inner spindle maybe moved axially within the outer spindle to selectively open and close the collet. The aggregate disclosure of this patent is hereby incorporated by reference with respect to the structure and operation of such a collet.

DISCLOSURE OF THE INVENTION

With parenthetical reference to the corresponding parts, portions or surfaces of the disclosed embodiment, merely for purposes of illustration and not by way of limitation, the present invention broadly provides an improved spindle assembly and method of forming same.

In one aspect, the invention provides a spindle assembly (23) that is adapted to be mounted in an opening (22) provided in a rotatable head (20) of a multi-spindle machine tool, such as a Davenport® multi-spindle screw machine. (Davenport® is a registered trademark of Davenport Industries, Inc., now Davenport Machine, Inc., 167 Ames Street, Rochester, N.Y. 14611.) The improved spindle assembly broadly comprises: a tubular main spindle part (26) adapted to be inserted into the head opening, and having a first abutment surface (42); a bearing retainer (27) adapted to be threaded into engagement with the head, and having a second abutment surface (55) arranged to face toward the first abutment surface; at least one bearing (28, 28, 28) acting radially between the head and spindle main part, and being arranged between the first and second abutment surfaces; and a retaining nut (29) adapted to be threaded into engagement with the spindle main part so as to form therewith an assembled spindle. The retaining nut has a third abutment surface (83) arranged to bear against the bearing retainer.

In the preferred embodiment, the first and second abutment surfaces are annular. The bearing may be compressed between the first and second abutment surfaces. Each bearing have an inner race (65) and an outer race (66). The first abutment surface (42) is arranged to engage one of the inner and outer races, and the second abutment surface is arranged to engage the other of the inner and outer races. The bearing retainer may have a reversed somewhat C-shaped transverse cross-section. The retaining nut may have a tongue (88) adapted to be inserted into the bearing retainer recess. The retaining nut has a frusto-conical surface (70).

The improved spindle assembly may further include: an inner spindle (49) operatively arranged within the assembled outer spindle, and a multi-fingered collet (51) mounted on one end of the inner spindle. The fingers (52) of the collet engage the frusto-conical surface (70) such that the opening and closing of the collet is determined by the axial position of the inner spindle relative to the assembled spindle. The machine tool may include a frame on which the head is rotatably mounted, first means (e.g., a first motor and associated drive mechanism) for rotating the head relative to the machine frame, and second means (e.g., a second motor and associated drive mechanism) for rotating the assembled spindle assembly relative to the head.

In another aspect, the invention provides a method of forming a spindle assembly, comprising the steps of: providing a body having an opening into which the spindle is to be mounted; providing a tubular main spindle part having a first abutment surface; inserting the main spindle part into the body opening; providing a bearing having an inner race and an outer race; positioning the bearing between the main spindle part and the body; providing a retaining nut having a second abutment surface; mounting the retaining nut on the body so as to compress the bearing between the first and second abutment surfaces; providing a retaining nut; mounting the retaining nut on the main spindle part so as to form therewith an assembled spindle; rotating the assembled spindle relative to the head; and grinding a frusto-conical surface on the retaining nut; thereby to form a frusto-conical surface on the retaining nut that is concentric with the rotational axis defined by the bearing.

This method may include the further steps of: disassembling the assembled spindle from the body; and reassembling the spindle on the head of a machine tool.

Accordingly, the general object of the invention is to provide an improved spindle assembly.

Another object is to provide an improved spindle assembly that is particularly adapted for use with a Davenport multi-spindle machine tool.

Still another object is to provide an improved method of forming a spindle assembly.

These and other objects and advantages will become apparent from the foregoing and ongoing written specification, the drawings and the appended claims.

BRIEF DESCRIPTION OF THE DRAWINGS

FIG. 4 is a reduced-scale longitudinal vertical sectional view of the retaining nut shown in FIG. 3.

FIG. 5 is a reduced-scale longitudinal vertical sectional view of the bearing retainer shown in FIG. 3.

FIG. 6 is a reduced-scale longitudinal vertical sectional view of the portion of the head about the spindle-receiving opening shown in FIG. 3, and a portion of the main spindle part.

FIG. 7 is a reduced-scale longitudinal vertical sectional view of the left marginal end portion of the inner spindle and the attached collet, as shown in FIG. 3.

DESCRIPTION OF THE PREFERRED EMBODIMENTS

Figure 2:
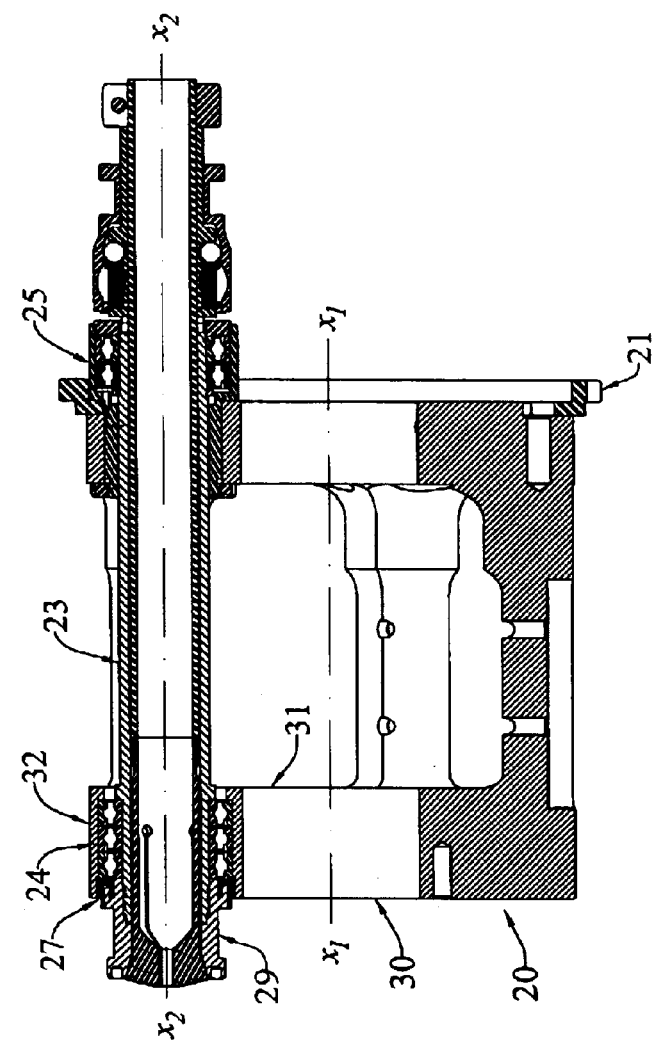
FIG. 2 is a fragmentary vertical sectional view thereof, taken generally on line 2—2 of FIG. 1, and principally showing the illustrated spindle assembly in longitudinal vertical cross-section.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
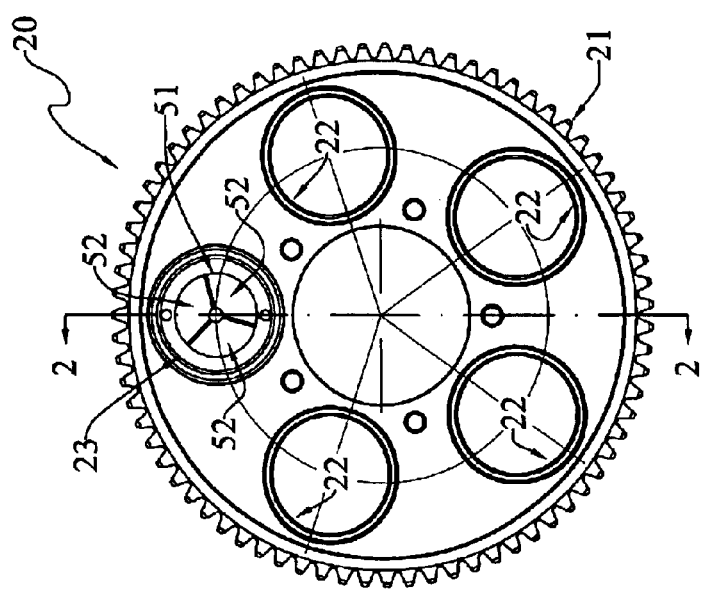
FIG. 1 is an left end elevation of the rotatable head of a multi-spindle machine tool, this view showing an improved spindle assembly as being operatively arranged in one of the five longitudinal openings provided through the head.

Referring now to the drawings, and, more particularly, to FIGS. 1 and 2 thereof, one aspect of the present invention broadly provides an improved spindle assembly that is adapted to be mounted in an opening provided on the rotatable head of a multi-spindle machine tool, while another aspect provides an improved method of forming such a spindle assembly.

In FIGS. 1–3 and 6, the rotatable head is generally indicated at 20. This head is shown as being a horizontally-elongated specially-configured member. The head has an outer peripheral toothed portion 21, and has five circularly-spaced longitudinal openings extending therethrough. In FIG. 1, these openings are severally indicated at 22. The head is adapted to be mounted on the frame (not shown) of a multi-spindle machine tool (not fully shown) for rotation about head axis $x_1$-$x_2$.

The improved spindle assembly is generally indicated at 23 in FIGS. 1 and 2. The spindle assembly is mounted on left and right bearing assemblies 24, 25, respectively for rotation about spindle axis $x_2$-$x_2$ relative to the head.

Figure 3:
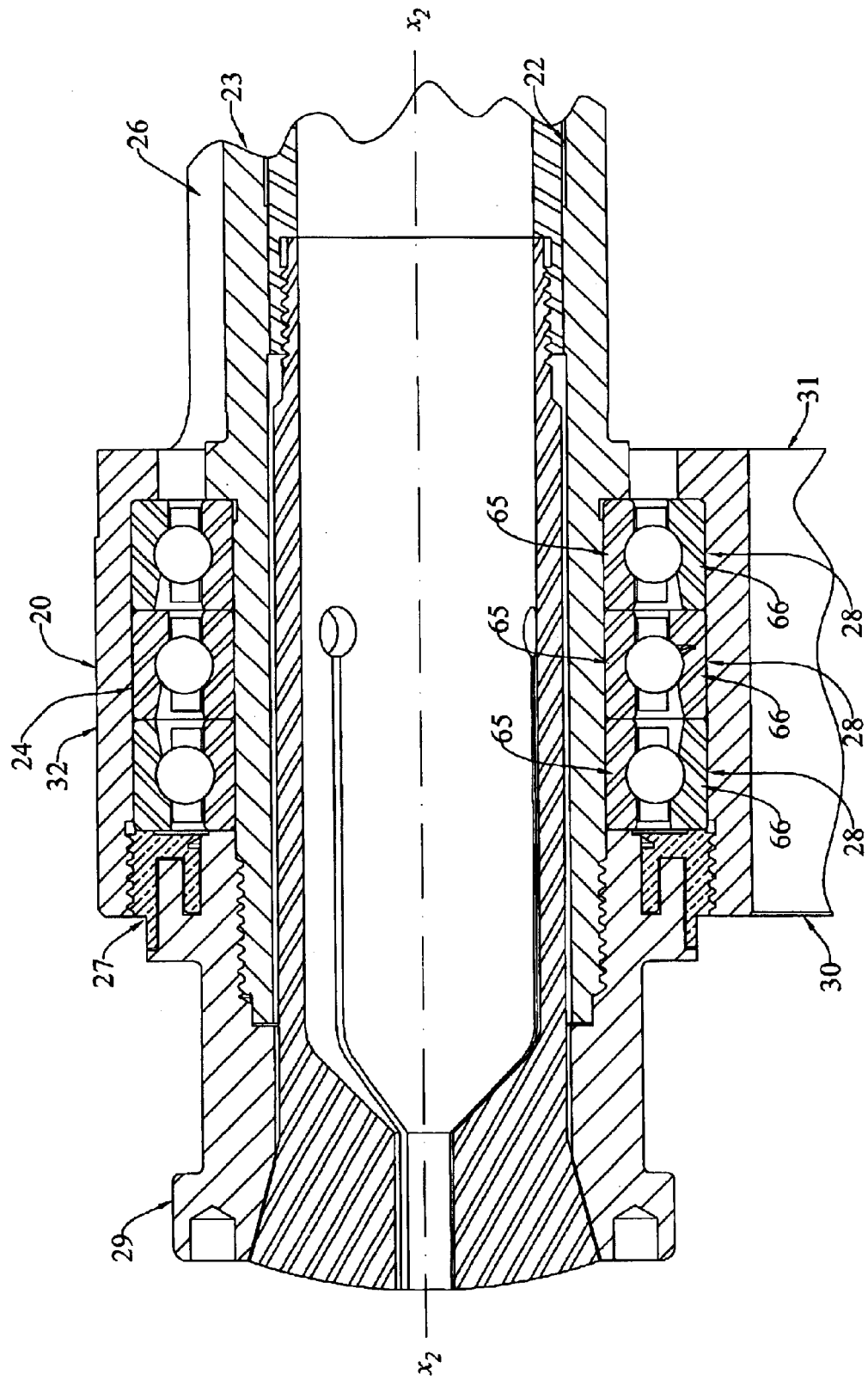
FIG. 3 is a greatly-enlarged fragmentary view of the left marginal end portion of the improved spindle assembly shown in FIG. 2.

As best shown in FIG. 3, the improved spindle assembly broadly includes a tubular main spindle part 26 that is adapted to be mounted in head opening 22; a bearing retainer 27; three radial bearings, severally indicated at 28, forming left bearing assembly 24; and a retaining nut 29 that is adapted to be removably mounted on the left marginal end portion of the spindle main part. More particularly, in FIG. 3, the left portion of head 20 is shown as having an annular vertical left face 30, an annular vertical right face 31, and an outer cylindrical surface 32 extending therebetween. As best shown in FIG. 6, the head opening 22 is shown as being sequentially bounded by: an internally-threaded portion 33 extending rightwardly from left end face 30, a horizontal cylindrical surface 34, a leftwardly-facing annular vertical surface 35, and a horizontal cylindrical surface 36 continuing rightwardly therefrom to join right end face 31.

The main spindle part 26 is shown as being a horizontally-elongated tubular member that is generated about $x_2$-$x_2$. The main spindle part has an annular vertical left end face 38, and an outer surface that sequentially includes (in pertinent part): a horizontal cylindrical surface 39 extending rightwardly from the outer margin of left end face 38, an externally-threaded portion 40, a horizontal cylindrical surface 41, a leftwardly-facing annular vertical surface 42, a horizontal cylindrical surface 43 continuing rightwardly from the outer margin of surface 42, a rightwardly-facing annular vertical surface 44, and a horizontal cylindrical surface 45 continuing rightwardly therefrom. Surface 42 forms a first abutment surface on the main spindle part. The main spindle part 26 is shown as having an inwardly-facing horizontal cylindrical surface 46 provided with a radially-reduced land portion, indicated at 48, to provide a slide bearing for the inner spindle.

As best shown in FIGS. 3 and 7, the inner spindle, generally indicated at 49, is shown as having a horizontally-elongated tubular part 50 that has its left marginal end portion mounted within outer spindle land portion 48 for guided axial sliding movement relative thereto. A collet, generally indicated at 51, is threaded on the left marginal end of the spindle inner part. This collet has three fingers, severally indicated at 52. These fingers have outwardly- and rightwardly-facing frusto-conical segmented surfaces 53 ground thereon.

Referring now to FIG. 5, the bearing retainer 27 is an annular or ring-like member having a reversed somewhat C-shaped transverse cross-section. More particularly, the bearing retainer has an annular vertical left end face 54, an annular vertical right end face 55, and an outer surface that sequentially includes: a horizontal cylindrical surface 56 extending rightwardly from the outer margin of left end face 54, a leftwardly-facing annular vertical surface 58, and an externally-threaded surface 59 continuing rightwardly therefrom to join the outer margin of right face 55. Right end face 55 forms a second abutment surface. The bearing retainer is also shown as having an annular recess that extends rightwardly into the bearing retainer from left end face 54. This recess is bounded by (in pertinent part): an inwardly-facing horizontal cylindrical surface 60 extending rightwardly from the inner margin of left end face 54, a leftwardly-facing annular vertical bottom surface 61, and an outwardly-facing horizontal cylindrical surface 62 extending leftwardly therefrom, a leftwardly-facing annular vertical surface 63, and an inwardly-facing horizontal cylindrical surface 64 extending rightwardly therefrom to join right end face 55.

Each of bearings 28 is commercially procurable, and has an inner race 65 and an outer race 66. There are three bearings shown in FIG. 3. The inner race of the rightward-most bearing is shown as engaging main spindle part first abutment surface 42. The outer race of the leftwardmost bearing is shown as engaging the right face 55 of bearing retainer 27.

Referring now to FIG. 4, the retaining nut 29 is shown as being a horizontally-elongated specially-configured member. More particularly, the bearing nut is shown as having an annular vertical left end face 68, an annular vertical right end face 69, and an inner surface that sequentially includes (from left-to-right): a leftwardly- and inwardly-facing frusto-conical surface 70, a horizontal cylindrical surface 71, a rightwardly-facing annular vertical surface 72, a horizontal cylindrical surface 73, and an internally-threaded portion 74 continuing rightwardly therefrom to join the right end face of the retaining nut. The outer surface of the bearing nut sequentially includes (again from left-to-right): a horizontal surface 75 extending rightwardly from the outer margin of left end face 68, a rightwardly-facing annular vertical surface 76, a horizontal cylindrical surface 78, a leftwardly-facing annular vertical surface 79, a horizontal cylindrical surface 80, a rightwardly-facing annular vertical surface 81, a horizontal surface 82, a rightwardly-facing annular vertical surface 83, a horizontal surface 84 extending leftwardly therefrom, a rightwardly-facing annular vertical surface 85, and a horizontal cylindrical surface 86 continuing rightwardly therefrom to join the right margin of right end face 69. Surfaces 82, 83 and 84 define therebetween an annular tongue, indicated at 88, that is arranged to be received in the annular recess of the bearing retainer.

The device is assembled as shown in FIG. 3. The main spindle part is positioned within the head opening. The bearings are slipped in between facing surfaces 34, 41 of the head and main spindle part, respectively. The bearing retainer is threaded into engagement with the head such that the bearing assembly 24 of the three bearings 28, 28, 28 is axially compressed between main spindle part first abutment surface 42 and bearing retainer second abutment surface 55. The retaining nut is then threaded onto the left marginal end portion of the main spindle part to form the spindle assembly.

Thus, one aspect of the invention provides a spindle assembly 23 that is adapted to be mounted in an opening 22 provided in a rotatable head 20 of a multi-spindle machine tool. The improved spindle assembly broadly comprises: a tubular main spindle part 26 adapted to be inserted into the opening, and having a first abutment surface 42; a bearing retainer 27 adapted to be threaded into engagement with the head, and having a second abutment surface 55 arranged to face toward the first abutment surface; at least one bearing 28 acting radially between the head and spindle main part, and being arranged between the first and second abutment surfaces; and a retaining nut 29 adapted to be threaded into engagement with the spindle main part so as to form therewith an assembled spindle, the retaining nut having a third abutment surface 83 arranged to bear against the bearing retainer.

In another aspect, the invention provides an unique method of forming a spindle assembly. This method broadly includes the steps of providing a body, which may be head 20 or some other member, having an opening 22 into which a spindle assembly is to be mounted, and providing a tubular main spindle 26 having a first abutment surface 42. The main spindle is inserted into the body opening. The bearing(s) 28, 28, 28 are provided. As indicated above, each bearing as an inner face 65 and an outer race 66. The bearing(s) are positioned between the main spindle and the body. The retaining nut 27 is then threaded onto the body so as to axially compress the bearing(s) between the first and second abutment surfaces. The retaining nut is then mounted on the spindle. The spindle-retaining subassembly is then rotated about the axis defined by the bearing(s), and the frusto-conical surface 70 is then concentrically ground on the retaining nut.

Thereafter, the retaining nut is removed from the assembly, and the spindle-bearing-retainer-retaining nut is then disassembled from the body and remounted onto the head of a multi-spindle machine tool. Thus, in this manner, frusto-conical surface 70 on the bearing retainer is ground so as to be concentric with the spindle axis defined by bearings 28, 28, 28. This then affords the capability of greater precision when mounted on a multi-spindle screw machine head.

Modifications

The present contemplates that many changes and modifications may be made. For example, the materials of construction are not deemed to be particularly critical, and may be changed or modified as desired. Bearing(s) other then those shown may be substituted therefore. The bearing retainer may take other forms then that shown. Similarly, the retaining nut may have other forms as well.

Therefore, while the presently-preferred form of the improved spindle assembly as been shown and described, and several modifications thereof discussed, persons skilled in this art will readily appreciate that various additional changes and modifications may be made without departing from the spirit of the invention, as defined and differentiated by the following claims.

What is claimed is:

1. A spindle assembly adapted to be mounted in an opening provided in a rotatable head of a multi-spindle machine tool, comprising:

a tubular main spindle part adapted to be inserted into said opening, and having a first abutment surface;

a bearing retainer adapted to be threaded into engagement with said head, and having a second abutment surface arranged to face toward said first abutment surface;

at least one bearing acting radially between said head and spindle main part, and being arranged between said first and second abutment surfaces; and a retaining nut adapted to be threaded into engagement with said spindle main part so as to form therewith an assembled spindle, said retaining nut having a third abutment surface arranged to bear against said bearing retainer.

2. A spindle assembly as set forth in claim 1 wherein said first and second abutment surfaces are annular.

3. A spindle assembly as set forth in claim 1 wherein said bearing is arranged to be compressed between said first and second abutment surfaces.

4. A spindle assembly as set forth in claim 1 wherein said bearing has an inner race and an outer race, wherein said first abutment surface is arranged to engage one of said inner and outer races, and wherein said second abutment surface is arranged to engage the other of said inner and outer races.

5. A spindle assembly as set forth in claim 1 wherein said bearing retainer has a C-shaped transverse cross-section.

6. A spindle assembly as set forth in claim 5 wherein said retaining nut has a tongue adapted to engage said bearing retainer.

7. A spindle assembly as set forth in claim 1 wherein said retaining nut has a frusto-conical surface.

8. A spindle assembly as set forth in claim 7, and further comprising:
- an inner spindle operatively arranged within said assembled spindle, and
- a multi-fingered collet mounted on one end of said inner spindle, the fingers of said collet engaging said frusto-conical surface such that the opening and closing of said collet is determined as a function of the axial position of said inner spindle relative to said assembled spindle.

9. A spindle assembly as set forth in claim 1 wherein said machine tool includes a frame on which said head is rotatably mounted, first means for rotating said head relative to said frame, and second means for rotating said assembled spindle assembly relative to said head.

10. The method of forming a spindle assembly, comprising the steps of:
- providing a body having an opening into which said spindle is to be mounted;
- providing a tubular main spindle part having a first abutment surface;
- inserting said main spindle part into said body opening;
- providing a bearing having an inner race and an outer race;
- positioning said bearing between said main spindle part and said body;
- providing a retaining nut having a second abutment surface;
- mounting said retaining nut on said body so as to compress said bearing between said first and second abutment surfaces;
- providing a retaining nut;
- mounting said retaining nut on said main spindle part so as to form therewith an assembled spindle;
- rotating said assembled spindle relative to said head; and
- grinding a frusto-conical surface on said retaining nut;
- thereby to form a frusto-conical surface on said retaining nut that is concentric with the rotational axis defined by said bearing.

11. The method as set forth in claim 10, comprising the further steps of:
- disassembling said assembled spindle from said body; and
- reassembling said spindle on the head of a machine tool.

* * * * *